E. C. GRIZZELL.
TRANSMISSION FRICTION CLUTCH.
APPLICATION FILED SEPT. 13, 1910.
1,001,140.
Patented Aug. 22, 1911.
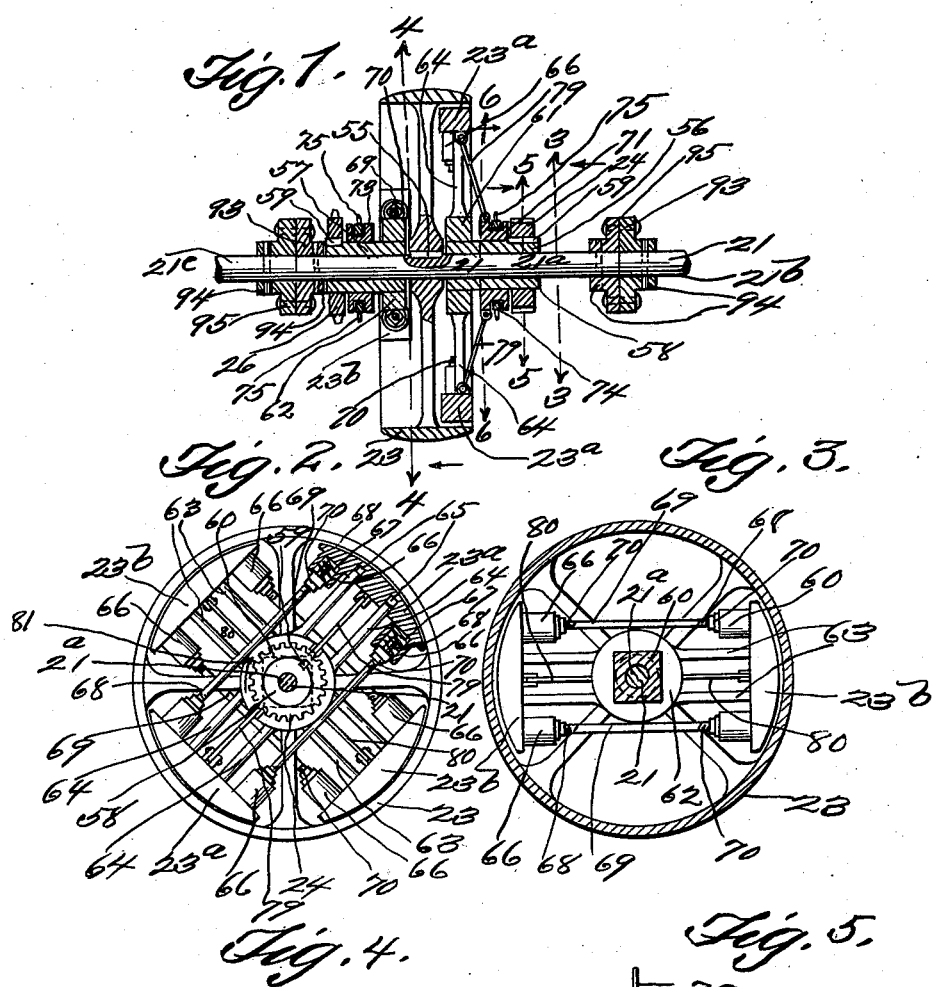
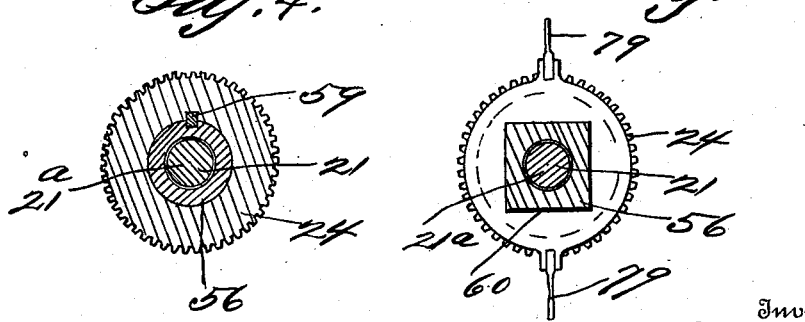

UNITED STATES PATENT OFFICE.

EMERY C. GRIZZELL, OF CLAFLIN, KANSAS.

TRANSMISSION FRICTION-CLUTCH.

1,001,140.　　　　Specification of Letters Patent.　　Patented Aug. 22, 1911.

Original application filed February 12, 1910, Serial No. 543,624. Divided and this application filed September 13, 1910. Serial No. 581,880.

*To all whom it may concern:*

Be it known that I, EMERY C. GRIZZELL, a citizen of the United States, residing at Claflin, in the county of Barton and State of Kansas, have invented a new and useful Transmission Friction-Clutch; and I do hereby declare the following to be a full, clear, and exact description of the invention, such as will enable others skilled in the art to which it appertains to make and use the same.

This invention belongs to the art of clutches, and it particularly pertains to a new and useful transmission friction clutch, in which various novel features are involved.

The essential object of the invention is to provide a novel transmission friction clutch, whereby power may be easily and readily transmitted, to any suitable machinery (not shown); furthermore, to provide such a clutch, which, when operated, to reverse, will change the motion of the operating parts of said machinery.

The invention aims as a further feature, to provide a novel resiliently mounted clutch shoes or members, to be alternately thrown into frictional contact with the transmission clutch wheel.

In the drawings:—Figure 1 is a vertical sectional view transversely through the transmission friction clutch mechanism. Fig. 2 is a sectional view on line 3—3 of Fig. 1, looking in the direction of the arrow, and showing the clutch wheel and the clutches in side elevation, there being one of the clutch members shown in section. Fig. 3 is a sectional view on line 4—4 of Fig. 1, showing one of the clutches in elevation, and further displaying how a portion of the clutch member is fixed to rotate with a rectangular shaped sleeve (which is mounted on a cylindrical shaft). Fig. 4 is a sectional view on line 5—5 of Fig. 1, showing how the gear is keyed to rotate with the cylindrical portion of a sleeve (which is mounted upon the section 21ª of the shaft 21), so the section 21ª of the shaft will rotate freely when the clutch members are not frictionally engaging the clutch wheel. Fig. 5 is a sectional view upon line 6—6 of Fig. 1, illustrating the manner of mounting the slidable clutch hub upon a rectangular portion of the sleeve shown in Fig. 4.

Referring to the drawings, 21 denotes a crank shaft, on which is a transmission friction clutch wheel 23, which is adapted to transmit power to any suitable device (not shown). The clutches or members 23ª and 23ᵇ of the clutch wheel may be thrown in and out of contact with the wheel 23. The crank shaft 21 is constructed in three sections 21ª 21ᵇ, and 21ᶜ. Mounted on the section 21ª are the sprocket wheel and the gear 26 and 24, which are designed for the purpose of transferring forward or reverse power to any suitable device. The friction clutch wheel 23 is keyed, as shown at 55, to the section 21ª of the shaft 21, in order to rotate therewith. Loosely journaled upon the section 21ª of the shaft 21 are sleeves 56 and 57, the end portions 58 of which are cylindrical, as shown clearly in Fig. 3, and to these end portions the pinion 24 and sprocket wheel 26 are keyed, by means of the feathers 59. It will be observed that the wheel 24 and sprocket wheel 26 will rotate with the said sleeves. The remaining portions of the sleeves 56 and 57 are rectangular in cross section, as will be clearly seen at 60 in Figs. 3 and 4, as well as in Fig. 6. Mounted upon the rectangular portions of said sleeves are clutch hub members 61 and 62, from which spokes or rods 63 and 64 project at right angles to one another. The clutch members or shoes 23ª and 23ᵇ are mounted upon the ends of these rods or spokes to slide outwardly, as shown clearly at 65 in Fig. 3 in order to be thrown in contact with the clutch wheel 23. The clutch members or shoes are provided with integral shells 66, in which springs 67 as shown in Fig. 3, are mounted. Passing through the springs are the threaded ends 68 of the rods 69, and threaded upon the rods 69 are nuts or members 70, between which and the clutch members or shoes the said springs are interposed. By adjusting these nuts toward the springs, it will be clearly seen that the tendency of the clutch members or shoes is to engage the clutch wheel. Also, mounted upon the rectangular portions of the sleeves 56 and 57 are slidable clutch hubs 71 and 72, which are provided with annular grooves 73 for the reception of the collars 74. Projecting from the collars 74 are pins 75, with which the forked ends of levers (not shown) engage for shifting the clutch hubs.

Connecting the slidable clutch hubs and the clutch members or shoes are rods 79 and 80, and through these connecting rods the clutch members or shoes may be thrown in engagement with the clutch wheel, when the slidable clutch hubs are moved toward the clutch wheel. When the slidable clutch hubs are moved away from the clutch wheel, the clutch members or shoes are drawn inwardly and toward the crank shaft, against the tension of the springs 67. When operating, the clutch members or shoes, so as to contact with the clutch wheel, they are assisted by the expansion of the springs 67.

When it is desired to move the machine forward, the clutch hub 72 is shifted, so that the clutch members or shoes 23ª are thrown in engagement with the clutch wheel. In this case the gear 24 is rotated in the direction of the arrow 81, which in turn may be adapted for transmitting power to other devices. To reverse the machine, the clutch hub 71 is shifted so as to throw the clutch members or shoes 23ᵇ in engagement with the clutch wheel 23, and by so doing the directions of the rotation of the other device is changed.

The sections 21ª, 21ᵇ and 21ᶜ are coupled together, shown more clearly in Fig. 2, by means of collars 93. Penetrating the flanges of the collars are bolts 95 to hold them securely in place. These collars are secured to the sections of the shaft 21, by means of pins 94, in order that the sections of the shaft 21 may rotate as one body.

This invention is a divisional application, divided from the allowed application for a patent upon a traction engine gearing, filed Feb. 12, 1910, Serial No. 543,624, and allowed July 12, 1910.

The invention having been set forth, what is claimed as new and useful is:—

In combination, a shaft, a friction clutch wheel keyed thereto, a sleeve journaled on the shaft, a hub member rotatable with the sleeve and provided with outwardly extending rods, friction clutch shoes guided upon the extremities of the rods adjacent the inner circumference of the band of the wheel, rods extending substantially transversely of the wheel with their ends extended into the shoes, adjustable members threaded on the transversely extending rods, springs encircling the extremities of the last rods between the bottoms of the shoes and the adjustable members for holding the shoes outwardly against the inner circumference of the clutch wheel, a clutch hub slidably mounted on the sleeve and provided with link connections with the friction clutch shoes for throwing them out of contact with the inner surface of the band of the clutch wheel.

In testimony whereof I have signed my name to this specification in the presence of two subscribing witnesses.

EMERY C. GRIZZELL.

Witnesses:
H. C. EMBRY,
CLINTON GIBLER.